UNITED STATES PATENT OFFICE.

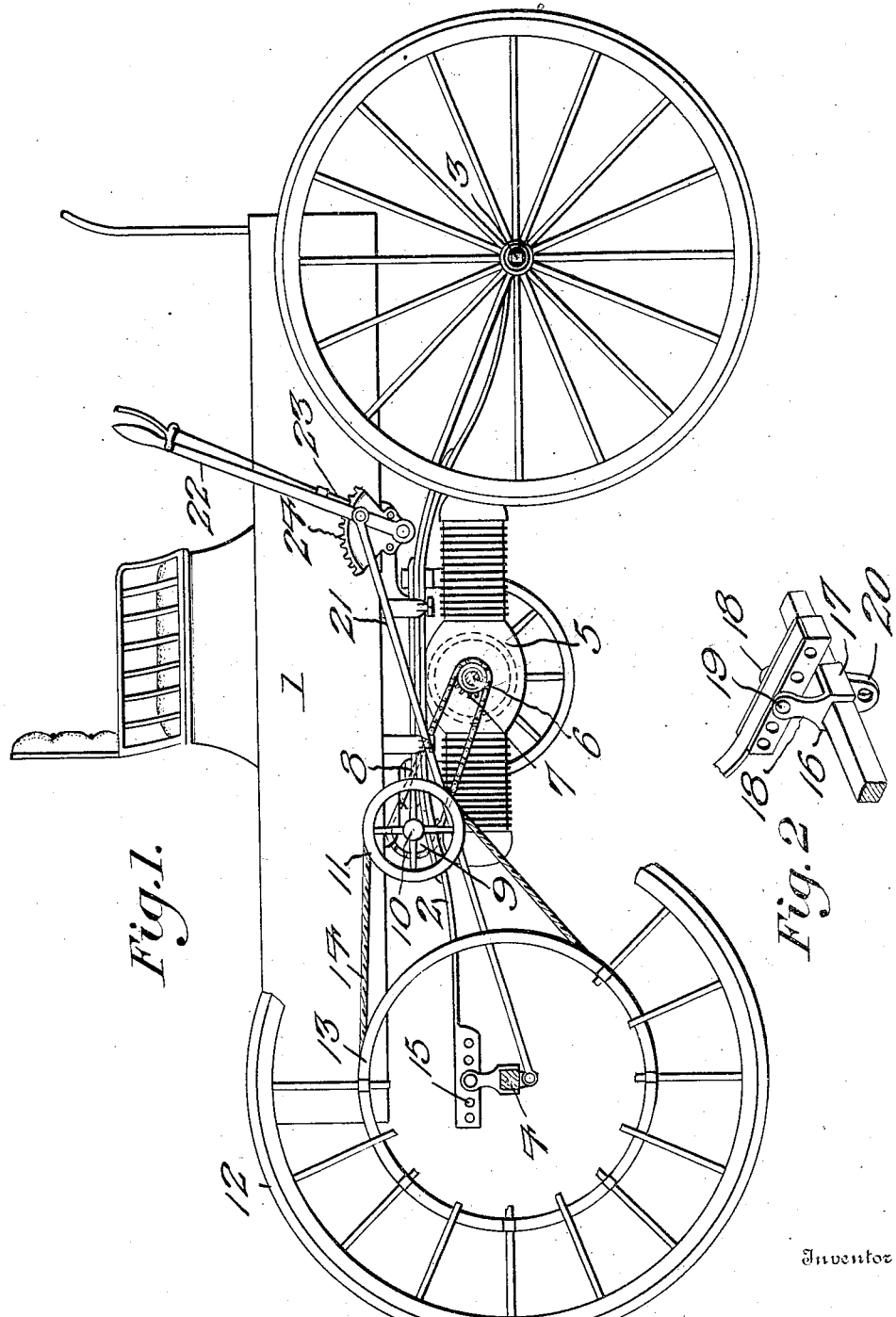

GEORGE P. PARKS, OF BEDFORD, INDIANA, ASSIGNOR, BY DIRECT AND MESNE ASSIGNMENTS, TO POSTAL AUTO AND ENGINE COMPANY, OF BEDFORD, INDIANA.

MOTOR-VEHICLE.

No. 870,459.　　　　Specification of Letters Patent.　　　　Patented Nov. 5, 1907.

Application filed November 10, 1906. Serial No. 342,839.

*To all whom it may concern:*

Be it known that I, GEORGE P. PARKS, a citizen of the United States of America, residing at Bedford, in the county of Lawrence and State of Indiana, have invented new and useful Improvements in Motor-Vehicles, of which the following is a specification.

This invention relates to improvements in motor vehicle construction, and particularly to the running and driving gear thereof, the object of the invention being to provide, in a vehicle of that type in which the rear driving wheels are driven by belting from a drive shaft, improved means for supporting the rear axle from the springs of the running gear and adjusting said axle to take up slack in the drive belts.

In the accompanying drawings,—Figure 1 is a side view of a motor vehicle embodying the invention, the rear wheel being partially broken away and the rear axle shown in transverse section to better disclose the construction. Fig. 2 is a detail view showing the form of the pivotal connections between the rear axle and springs.

Referring to the drawings, 1 designates the body of the vehicle, supported at each side upon a longitudinal spring 2 extending between and connected with the front and rear axles 3 and 4. Suitably mounted upon the running gear of the vehicle is a motor 5 whose shaft 6 carries a sprocket pinion 7 from which a drive chain 8 leads to a sprocket wheel 9 on a driving counter shaft 10, to which is fixed a drive pulley 11. Each rear wheel 12 is revolubly mounted upon the rear axle 4 and carries a belt rim or pulley 13 connected with the driving pulley 11 by an endless drive belt 14. The axle 4 is stationary except in so far as it is adjustably mounted upon the two springs 2 to effect the adjustment of the wheels 12 to take up slack in the drive belt, and it will be understood that while the driving connection for but one rear wheel is shown, each rear wheel is driven in the same manner.

The rear end of each spring 2 is suitably enlarged and provided with a longitudinal row or series of transverse openings 15, and the axle 4 is pivotally supported from these enlarged ends of the springs by brackets 16. Each bracket 16 comprises a body portion 17 suitably fastened to the axle and provided with a pair of upstanding ears 18 pierced for the passage of a transverse pivot pin 19 adapted to also pass through either one of the openings 15 in the spring to pivotally connect the bracket therewith. An apertured lug 20 depends from one of the brackets 16, and to said lug is pivotally connected the lower rear end of a rod 21 pivotally attached at its upper forward end to an operating lever 22 fulcrumed upon one side of the vehicle, said lever carrying an ordinary form of locking dog or pawl 23 to engage a stationary rack 24.

It will be seen from the foregoing description that by throwing the lever forwardly or rearwardly the rod 21 will be moved to swing the rear axle 4 upon the rear ends of the springs either forward or rearward, thereby shifting the positions of the wheels to loosen or tighten the driving belts 14 as occasion may require. By means of the adjustable connection between the brackets and springs the rear axle may also be moved forwardly or rearwardly to compensate for any abnormal degree of tautness or slackness of the driving belts.

Having thus described the invention, what is claimed as new, is:—

1. In a motor vehicle, the combination of reach springs, an axle pivotally connected with the springs, means for adjusting the pivotal connections longitudinally on the springs, drive wheels carried by the axle, belt gearing for driving said wheels, and means for swinging the axle on its pivotal connections for adjusting said gearing.

2. The combination, in a vehicle, of reach springs, each provided with a series of openings, an axle, brackets carried by the axle, pivot pins for pivotally connecting the brackets adjustably with the opposite portions of the springs, drive wheels carried by the axle, belt gearing for driving said wheels, and means for swinging the axle on the said pivotal connection.

3. The combination, in a vehicle, of reach springs provided with enlarged rear ends, each having a series of transverse openings, an axle, brackets carrying the axle and provided with upstanding portions, pins passing through said portions and pivotally connecting the same with the apertured portions of the springs, drive wheels carried by the axle, belt gearing for driving said wheels, and means for swinging the axle on the pivotal connections.

4. The combination, in a vehicle, of reach springs, each provided with an enlarged rear end having a series of transverse openings, an axle arranged below the springs and carrying drive wheels, brackets engaging the axle and having upturned ears embracing the apertured ends of the springs, pins connecting said ears with the apertured ends of the axle, belt gearing for driving the wheels, and means connected with a depending portion of one of said brackets for swinging the axle on its pivotal connections.

In testimony whereof, I affix my signature in presence of two witnesses.

GEORGE P. PARKS.

Witnesses:
B. B. MARLEY,
JOHN MARLEY.